May 15, 1951     W. M. SMITH     2,552,744

STRAINER

Filed July 20, 1948

INVENTOR.
William M. Smith
BY
McMorrow, Berman + Davidson
ATTORNEYS

Patented May 15, 1951

2,552,744

UNITED STATES PATENT OFFICE 2,552,744

STRAINER

William M. Smith, Clay City, Ill.

Application July 20, 1948, Serial No. 39,745

2 Claims. (Cl. 210—164)

This invention relates to an improved suction strainer for mud pumps and the like, the primary object of the invention being to provide an efficient and rugged strainer of this type which can be dismantled, cleaned, and reassembled in a shorter space of time than other strainers of this general class.

Another important object of the invention is to provide a strainer of the above indicated character which is composed of a relatively small number of simple parts, and in which the screen is very easily removable and replaceable.

Other important objects and advantageous features of the invention will be apparent from the following description and the accompanying drawings wherein, merely for present purposes of illustration, a specific embodiment of the invention is set forth in detail.

Figure 1:
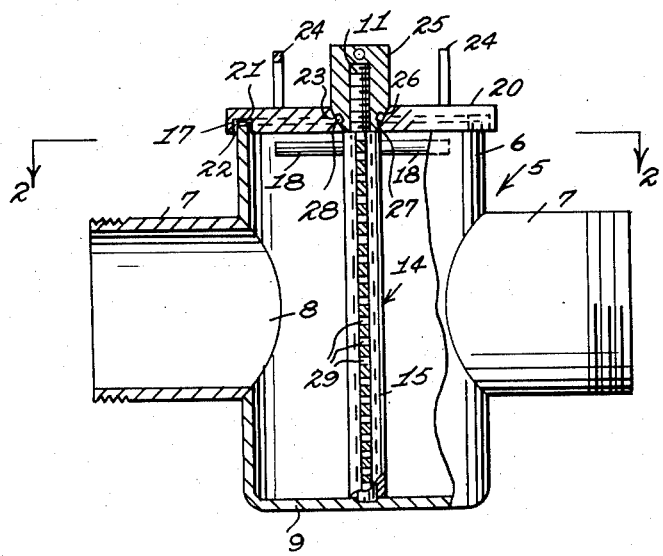
Figure 1 is a general vertical longitudinal sectional view taken through the illustrated strainer.
Figure 2:
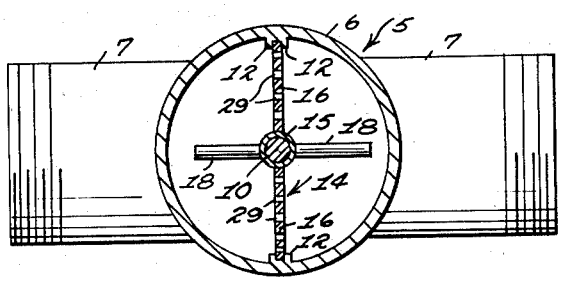
Figure 2 is a horizontal section taken on the line 2—2 of Figure 1.
Figure 3:
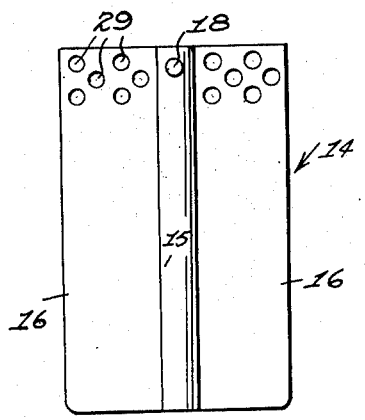
Figure 3 is a side elevation of the removable screen.

Referring in detail to the drawings, the illustrated strainer comprises the generally cruciform body, generally designated 5, composed of the vertical cylindrical open top middle part 6, and the diametrically opposed smaller diameter arms 7, 7 which are smaller in internal diameter than the middle part 6 and open thereinto, as indicated at 8, 8 midway between the upper and lower ends of the middle part.

Fixed to the center of the bottom 9 of the middle part 6, as by welding, is the stem 10 which rises above the upper end of the middle part 6, with its upper part threaded, as indicated at 11.

Halfway between the arms 7, 7 on opposite sides of the cylinder 6 are pairs of vertical guide ribs 12, 12 which slidably receive the opposite edges of the screen 14, which comprises a central vertical sleeve 15, to which the diametrical plate-like portions 16, 16 may be integrally formed or attached as by welding. The screen 14 when resting upon the cylinder bottom 9 reaches to the level of the upper end 17 of the cylinder 6. Radial handles 18, 18 are provided at the upper end of the sleeve 15 enabling lifting the screen 14 into and out of place.

The open upper end 17 of the cylinder 6 is closed by a disk cover 20 having an annular packing groove 21 in its underside receiving the upper end 17 and containing a hydraulic packing 22. The cover 20 is further formed with a tapered center opening 23 and is provided in opposite sides of its top with bail handles 24 facilitating handling of the cover.

A cylindrical cap nut 25, having a tapered lower portion 26 conformably receivable in the tapered cover hole 23, is adapted to be threaded down on the upper part 11 of the stem 10 to press the cover 20 in place and thereby hold the screen 14 in place. The tapered lower part 26 of the nut is provided with a packing groove 27 provided with hydraulic packing 28 for sealing the engagement of the nut portion 26 and the cover hole 23.

The plate portions 16, 16 of the screen 14, which are provided with evenly spaced strainer holes 29 in staggered relation throughout their areas, provide together a screen area greater than the cross section of either of the openings 8, 8 of the arms 7, 7 into the cylindrical middle part 6 of the strainer body 5, whereby the straining efficiency of the device is enhanced.

It will be observed that all that is necessary to do to dismantle the strainer for cleaning is to screw off the cap nut 25, remove the cover 20, and lift out the screen 14. With the cylinder 6 cleaned out the device is reassembled simply by dropping the screen 14 back into place, returning the cover 20 to position, and screw the cap nut 25 down in place.

Where it is desired to temporarily dispense with the screen 14, as when pumping material too heavy for the screen, the screen may be removed as above described, after which the cover 20 is replaced and the nut 25 screwed down, whereupon the device is ready for such use.

What is claimed is:

1. A suction strainer for fluids comprising a vertically disposed hollow cylinder open at one end, inlet means positioned intermediate the top and bottom of said cylinder and carried by the latter, outlet means positioned in opposed relation with respect to said inlet means and carried by said cylinder, a vertically disposed rod positioned axially of said cylinder and having the lower end thereof fixedly secured to the bottom of said cylinder, straining means arranged radially with respect to said rod and mounted thereon for sliding movement longitudinally of said cylinder, guide means on the inner surface of the wall of said cylinder and slidably engaging said straining means, a cover resting upon the open end of said cylinder, and hand actuated means extending through said cover and operatively engaging the upper end of said rod for connecting said cover to said cylinder.

2. A suction strainer for fluids comprising a vertically disposed hollow cylinder, open at one end, inlet means positioned intermediate the top and bottom of said cylinder and carried by the latter, outlet means positioned in opposed relation with respect to said inlet means and carried by said cylinder, a vertically disposed rod positioned axially of said cylinder and having the lower end thereof fixedly secured to the bottom of said cylinder, straining means arranged radially with respect to said rod and at right angles to the direction of fluid flow from said inlet to said outlet means, said straining means comprising a vertically disposed sleeve arranged in surrounding relation with said rod and mounted for sliding movement longitudinally of said cylinder and a pair of perforated plates arranged in opposed aligned relation about said each sleeve and rigidly secured to the latter, guide means carried on the inner surface of the wall of said cylinder and slidably engaging the other edges of said plates, a cover resting on the open end of said cylinder, and hand actuated means extending through said cover and operatively engaging the upper end of said rod for connecting said cover to said cylinder.

WILLIAM M. SMITH.

REFERENCES CITED

The following references are of record in the file of this patent:

UNITED STATES PATENTS

| Number | Name | Date |
| --- | --- | --- |
| 551,044 | Park | Dec. 10, 1895 |
| 1,817,376 | Izquierdo | Aug. 4, 1931 |
| 2,334,791 | Roffy | Nov. 23, 1943 |